United States Patent [19]
Painter

[11] 4,386,647
[45] Jun. 7, 1983

[54] TOOL FOR FORMING INTERPLATE CONNECTIONS

[75] Inventor: Roy Painter, Ashton-u-Lyne, England

[73] Assignee: Energy Research Associates, San Bruno, Calif.

[21] Appl. No.: 189,188

[22] Filed: Sep. 22, 1980

[51] Int. Cl.³ ............................................. B22D 19/04
[52] U.S. Cl. .................................. 164/332; 164/342; 164/DIG. 1; 249/162
[58] Field of Search ................. 164/DIG. 1, 109, 342, 164/332; 249/162

[56] References Cited

U.S. PATENT DOCUMENTS

| 1,542,642 | 6/1925 | Peddis | 164/342 X |
| 3,815,660 | 6/1974 | Gallagher et al. | 164/332 X |
| 4,164,310 | 8/1979 | DiGiacomo et al. | 164/DIG. 1 |

*Primary Examiner*—Gus T. Hampilos
*Attorney, Agent, or Firm*—Thomas E. Schatzel

[57] ABSTRACT

A tool for forming electrical interconnections between the terminal ends of storage cell plate lugs. This tool is particularly suited to forming such welds between the terminal ends of plate lugs which project through a cell case wall.

2 Claims, 7 Drawing Figures

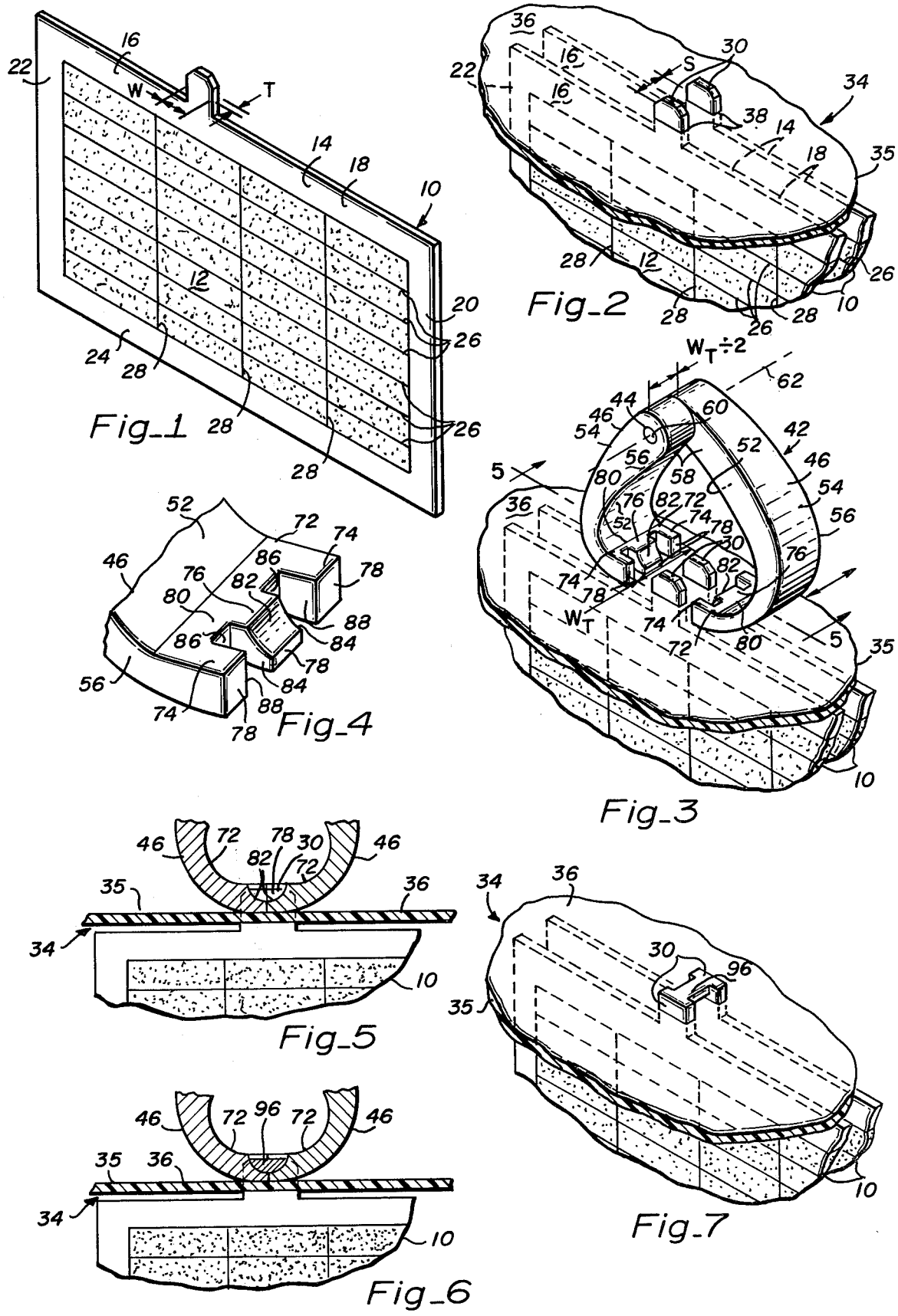

TOOL FOR FORMING INTERPLATE CONNECTIONS

BACKGROUND OF THE INVENTION

1. Field of the Invention

The present invention relates generally to methods of constructing storage cells and more particularly to forming welded joints between the terminal ends of adjacent cell plate lugs.

2. Description of the Prior Art

Generally, the lugs of the plates belonging to a cell and in particular lead acid storage cells are welded together prior to insertion into a case. The lugs of plates to be thus joined, after being positioned adjacent to each other, are retained in that position by means of a jig while the welds are formed. The plates, thus joined, are then inserted into the case which is then sealed so that the welds are contained within the walls and the volume of the cell case.

The word "weld," as used in connection with the construction of cells and in particular lead acid storage cells, generally refers to the process by which lead or lead alloy materials are melted and caused to contact and to join with solid material. When the material being melted is lead or a lead alloy, this process may also be called "soldering." As used in this application, the word "weld" is intended to have its broadest interpretation including the meaning of "soldering" and to generally include any process in which molten material is applied to and retained in contact with solid material while the molten material cools and solidifies.

SUMMARY OF THE PRESENT INVENTION

An object of the present invention is to provide a tool and method for the formation of welds between the terminal ends of cell plate lugs projecting through a cell wall.

Another object of the present invention is to provide a tool and method for forming welds having a minimum cross-sectional area thereby forming a weld capable of conducting a predetermined electrical current.

Another object of the present invention is to provide a tool and method which minimizes the quantity of material used in forming welds between adjacent cell plate lugs.

Another object of the present invention is to provide a tool and method for forming welds between the terminal ends of adjacent cell plate lugs projecting through a cell wall which establishes a pre-defined minimum gap between the weld and the immediately adjacent cell wall.

Another object of the present invention is to provide a tool and method for joining cell plate lugs which does not require the use of pre-formed components.

Another object of the present invention is to provide a tool and method for forming welds between adjacent cell plate lugs which minimizes heat damage to the plates and to the adjacent cell wall.

Briefly, a preferred embodiment of the tool of the present invention is a caliper-shaped device which includes a pair of identically shaped, arcuate jaws. These jaws are rotatably attached to each other at one of their terminal ends while their other terminal ends are shaped into mating comb-shaped structures. The teeth of these mating combs are shaped so as to fit snugly beside surfaces of lugs to be joined and so as to form a well intermediate the adjacent side surfaces of the lugs in which the weld will be formed.

The preferred embodiment of the method of this invention consists in inserting the lugs of a plurality of plates through pre-formed apertures in a cell wall. The tool of this invention is then closed around the projecting terminal ends of these lugs with the outside surface of the tool in intimate contact with the cell wall. The combs of the tool thus mated form a semi-circular sealed well between the immediately adjacent side surface of the lugs. The combs thus mated also seal all the side surfaces of the lugs to be joined. The teeth of the comb which are adjacent to the outermost side surfaces of the lugs to be joined do not form a semi-circular well when mated. Rather they are formed so as to establish a surface along the side surfaces of the lugs which projects upward to or above the top surface of the weld to be formed. A quantity of the melted material used to form the weld is then placed within the well between the adjacent side surfaces of the lugs. The tool of this invention is then maintained in its mated position around the lugs until the molten material cools and solidifies. After the material solidifies forming the weld between the lugs, the jaws of the tool are moved apart, thereby permitting the teeth of the comb which formed the well to pass upward around the weld as the tool is removed.

An advantage of the tool and method of the present invention is that it permits welding together adjacent terminal ends of cell plate lugs projecting through a cell wall.

Another advantage of the tool and method of the present invention is that it permits forming welds between cell plate lugs which have a minimum cross-sectional area thereby permitting the weld thus formed to conduct a pre-determined electrical current.

Another advantage of the tool and method of the present invention is that a weld may be formed by using a minimum amount of material.

Another advantage of the tool and method of the present invention is that a weld may be formed having a minimum pre-established gap between the surface of the weld and the immediately adjacent surface of the cell wall.

Another advantage of the present invention is that it does not require the use of pre-formed components.

Another advantage of the present invention is that heat damage to the plates and immediately adjacent cell wall is minimized.

These and other objects and advantages of the present invention will no doubt become obvious to those of ordinary skill in the art after having read the following detailed description of the preferred embodiments as illustrated in the various drawing figures.

IN THE DRAWING

FIG. 1 is a perspective view of a cell plate;

FIG. 2 is a partially sectioned perspective view of a pair of cell plates of FIG. 1 whose electrical connection lugs are positioned through a cell wall;

FIG. 3 is a perspective view of the joint forming tool of this invention positioned to be closed around the terminal ends of the plate lugs of FIG. 2;

FIG. 4 is an enlarged perspective view of one pair of the joint-forming tool of FIG. 3;

FIG. 5 is a cross-sectional view of the closed joint-forming tool taken along the line 5—5 of FIG. 3 and after forming the weld;

FIG. 6 is a partially sectioned perspective view of the pair of plates of FIG. 2 with a weld formed between the terminal ends of their lugs; and FIG. 7 is a perspective view of the pair of plates of FIG. 6 with the joint-forming tool removed.

DETAILED DESCRIPTION OF THE PREFERRED EMBODIMENTS

FIG. 1 shows a plate, referred to by the general reference number 10, as might be incorporated into a lead acid storage cell. The plate 10 may be fabricated by pasting an active material 12 onto a grid 14. The grid 14 includes a unitary rectangular frame 16 having an upper horizontal member 18, a first vertical member 20, a second vertical member 22, and a lower horizontal member 24. The grid 14 further includes a plurality of horizontal grid wires 26 extending end-to-end between the vertical members 20 and 22 and a plurality of vertical grid wires 28 extending end-to-end between the horizontal frame members 18 and 24. A lug 30 having a rectangular cross-sectional shape with a thickness "T" and a width "W" protrudes from the top side surface of the member 18 to provide means for making electrical connection to the grid 14. In manufacturing, the grid 14 intended for use in lead acid cells can be cast as a single piece from an antimony-lead alloy. The active material 12 of the plate 10 is pasted around and between the horizontal grid wires 26 and the vertical grid wires 28 within the area enclosed by the frame 16.

FIG. 2 shows a section of a cell wall referred to by the general reference number 34 with a wall 35 having an upper surface 36. A pair of rectangular apertures 38 adapted to receive the lug 30 are formed through the wall 35. The appertures 38 are located in the wall 35 such that insertion of the lugs 30 through them positions the plates 10 substantially parallel to each other and positions side surfaces of the lugs 30 adjacent to each other separated by a distance "S".

FIG. 3 shows the tool of this invention referred to by the general reference number 42 positioned above the top surface 36 of the cell wall 35 and about the lugs 30. The tool 42 comprises a rod-shaped pin 44 and a pair of unitary, identically shaped arcuate jaws 46. The arcuate jaws 46 have an inner arcuate side surface 52 and an outer arcuate side surface 54. Intermediate between and perpendicular to the arcuate surfaces 52 and 54 is a planar side surface 56. Also intermediate between and perpendicular to the arcuate surfaces 52 and 54 is a curved side surface 58. A circular aperture 60, adapted to receive the pin 44, is formed through the jaw 46 perpendicular to the planar side surface 56. The pin 44 extends through an aperture 60 in both jaws 46, thereby securing them so that they are rotatable about an axis 62. The jaws 46 are arranged on the pin 44 such that the region of the curved side surfaces 58 surrounding the apperture 60 are positioned immediately adjacent to each other. The terminal end of the jaws 46 farthest from the circular apperture 60 have a width perpendicular to the planar side surface 56 of Wt and a width of one-half Wt at their terminal end adjacent to the circular aperture 60. Thus, with the jaws 46 disposed on the pin 44 as specified, the terminal ends of the curved side surfaces 58 of the jaws 46 farthest from the circular aperture 60 lie in the plane of the planar side surface 56 of the other jaw 46.

The terminal ends of the jaws 46 farthest from the circular aperture 60 are shaped so as to form a comb 72. In the preferred embodiment of this invention especially adapted to form welds between a pair of lugs 30, an end-wall tooth 74 projects outward from opposite terminal ends of the comb 72. A well-forming tooth 76 projects from the comb 72 intermediate the end-wall teeth 74. The terminal ends of the teeth 74 and 76 projecting from the comb 72 are formed to have coplanar end surfaces 78 which lie in a plane containing the axis of rotation 62. The comb 72 also has a planar top surface 80 formed perpendicular to the plane of the end surfaces 78. Thus, when the jaws 46 are closed and mated so that the planar end surfaces 78 of the teeth 74 and 76 contact each other, the top surfaces 76 become coplanar. The well forming tooth 76 has a well forming surface 82 formed in the shape of one-quarter of a right circular cylinder whose circular cylindrical axis is located at the intersection of the plane of the end surfaces 78 and the plane of the planar top surface 80. The well forming tooth 76 has a pair of planar side surfaces 84 formed perpendicular to its planar end surface 78 and which are separated by a distance slightly less than the width S between the lugs 30. Thus the well forming tooth 76 is adapted to fit between the lugs 30. The planar side surfaces 84 have a length perpendicular to the planar end surface 78 which is slightly greater than one-half the width "W" of the lug 30. A pair of planar joining surfaces 86, formed parallel to the planar end surface 78 project outward from the planar side surfaces 84 farthest from the planar end walls 78. The width of the planar joining surfaces 76 is slightly greater than the thickness "T" of the lug 30. The terminal end of each planar joining surface 86 farthest from the well forming tooth 76 is connected to the planar end surface 78 of the end wall tooth 74 by a planar side surface 88 formed perpendicular to the plane of the end surfaces 78. Thus, the planar side surfaces 84 and 88 are all formed perpendicular to the plane of the end surfaces 78, parallel to each other, with adjoining side surfaces 84 and 88 separated by a distance slightly greater than the thickness T of the lug 30. The planar joining surfaces 86 connect the side surfaces 84 and 88 into U-shaped troughs having a depth from the plane of the end surfaces 78 to the planar joining walls 86 slightly greater than one-half the width "W" of the lug 30.

Thus, when the jaws 46 are closed thereby mating the combs 72 along the plane of the end surfaces 78, the U-shaped troughs formed by the side surfaces 84 and 88 and the joining surface 86 form rectangular apertures slightly larger than the thickness "T" and width "W" of the lug 30. Since the side surfaces 84 of the well-forming tooth 76 are adapted to fit between the lugs 30 projecting through the cell wall 34, the rectangular apertures thus formed are adapted to fit snugly with the lugs 30. As shown in FIG. 5, when the combs 72 are thus mated, the well-forming surfaces 82 form a sealed semi-circular well intermediate the immediately adjoining side surfaces of the lugs 30. The side surfaces 88 of mated end-wall teeth 74 establish a surface along the outer side surfaces of the lugs projecting upward above the semi-circular surface formed by the well-forming surfaces 82.

Thus, the tool 42 may be employed to form a weld 96, as shown in FIG. 6, between the adjacent side surfaces of lugs 30 by first inserting the lugs 30 through the apertures 38 in the cell wall 35. The tool 42 is then closed around the projecting terminal ends of the lugs 30 with the outer arcuate side surface 54 in contact with the upper surface 36 of the cell wall 35. A quantity of material used to form the weld 96 is then melted and placed between the adjacent side surfaces of the lugs 30 within the semi-circular well formed by the well-forming surfaces 82. The tool 42 is then maintained in its mated position about the lugs 30 until the molten material cools and solidifies. After the material solidifies forming the weld 96 between the lugs 30, the jaws of the tool 42 are moved apart, thereby permitting the well-forming teeth 86 to pass upward around the weld 96 as the tool 42 is removed. The weld 96 thus formed with this tool between the lugs 30 is shown in FIG. 7.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A tool for forming joints between a plurality of cell plate lugs comprising, a rod shaped pin; and a pair of unitary identically shaped arcuate jaws, each of said jaws having two arcuate side surfaces, a planar side surface extending perpendicular to and intermediate said arcuate surfaces and a curved side surface also formed perpendicular to said arcuate surfaces, said curved side surface being formed such that one terminal end of said jaw has a width perpendicular to said planar side surface which is one-half the width of the other terminal end of said jaw, said narrower end of said jaw having a circular aperture formed therethrough along an axis perpendicular to said planar side wall, said aperture receiving said rod shaped pin, each of said jaws being disposed so that said circular aperture of each jaw engage said pin with curved side surfaces of said jaws about said aperture being positioned immediately adjacent to each other, whereby said jaws are secured to each other by said rod shaped pin so as to be pivotable about the axis of said pin, said wider terminal end of each of said jaws being shaped identically so as to form mated combs, each of said combs having a set of projecting teeth all of said teeth having planar terminal end surfaces formed coplanar with the axis about which the jaws rotate, said combs being formed with a planar upper surface formed perpendicularly to said plane of said planar terminal end surfaces, each set of projecting teeth include a pair of end wall teeth and a well-forming tooth with the end wall teeth located at opposite terminal ends of the comb respectively adjacent to the planar side surface and the curved side surface of the jaw and a well-forming tooth intermediate end wall teeth, said well-forming tooth having an arcuate upper well-forming surface all of said teeth having planar side surfaces formed perpendicular to the axis about which the jaws rotate, said well-forming tooth being of a width equal to the separation between said immediately adjacent side surfaces of said plate lugs and the width of said side teeth being equal to the thickness of said plate lug, said immediately adjacent teeth being separated and forming U-shaped troths for receiving the plate lugs.

2. The tool of claim 1 wherein, the arcuate upper well-forming surface is in the shape of one quarter of a right circular cylinder whose axis is located at the intersection of said plane of said end surfaces and said plane of said planar upper surface.

* * * * *